(12) United States Patent
Qiu et al.

(10) Patent No.: US 12,271,701 B2
(45) Date of Patent: Apr. 8, 2025

(54) METHOD AND APPARATUS FOR TRAINING TEXT CLASSIFICATION MODEL

(71) Applicant: TENCENT TECHNOLOGY (SHENZHEN) COMPANY LIMITED, Guangdong (CN)

(72) Inventors: Yao Qiu, Guangdong (CN); Jinchao Zhang, Guangdong (CN); Jie Zhou, Guangdong (CN); Cheng Niu, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 265 days.

(21) Appl. No.: 17/948,348

(22) Filed: Sep. 20, 2022

(65) Prior Publication Data

US 2023/0016365 A1 Jan. 19, 2023

Related U.S. Application Data

(63) Continuation of application No. PCT/CN2021/101372, filed on Jun. 22, 2021.

(30) Foreign Application Priority Data

Jul. 30, 2020 (CN) .......................... 202010753159.6

(51) Int. Cl.
*G06F 40/30* (2020.01)
*G06F 40/40* (2020.01)

(52) U.S. Cl.
CPC .............. *G06F 40/30* (2020.01); *G06F 40/40* (2020.01)

(58) Field of Classification Search
CPC ........ G06F 40/30; G06F 40/40; G06F 40/289; G06F 40/284; G06F 40/279;

(Continued)

(56) References Cited

U.S. PATENT DOCUMENTS

2019/0095432 A1 3/2019 Xia et al.
2022/0036890 A1* 2/2022 Yuan ..................... G10L 15/063

FOREIGN PATENT DOCUMENTS

CN 109933667 6/2019
CN 110457701 11/2019

(Continued)

OTHER PUBLICATIONS

Chinese Office Action issued Sep. 23, 2023 in corresponding Chinese Patent Application No. 202010753159.6.

(Continued)

*Primary Examiner* — Leshui Zhang
(74) *Attorney, Agent, or Firm* — Crowell & Moring LLP (57) ABSTRACT

This disclosure relates to a method and an apparatus for training a text classification model. The method may include determining a semantic representation of the training sample using the text classification model and determining a predicted classification result of the training sample based on the semantic representation. The method may further include generating an adversarial sample corresponding to the training sample based on the training sample and perturbation information and determining a semantic representation of the adversarial sample corresponding to the training sample using the text classification model. The method may further include determining a classification loss of the text classification model based on the predicted classification result, determining a contrastive loss of the text classification model based on the semantic representation and the semantic representation of the adversarial sample, and training the text classification model based on the classification loss and the contrastive loss.

20 Claims, 6 Drawing Sheets

(58) Field of Classification Search
CPC .... G06F 40/216; G06F 40/295; G06F 40/126; G06F 16/35; G06F 16/353; G06F 16/355; G06F 16/3344; G06F 16/3329; G06F 16/3346; G06F 18/214; G06F 18/24; G06F 18/2415; G06F 18/241; G06F 18/253; G06N 20/00; G06N 3/08; G06N 3/084
USPC ...... 704/1–9; 706/12, 13, 14, 15, 16, 17, 18, 706/20, 25, 55, 56, 57, 60, 62
See application file for complete search history.

(56) References Cited

FOREIGN PATENT DOCUMENTS

| CN | 110457701 | A | * | 11/2019 | | |
|---|---|---|---|---|---|---|
| CN | 110502976 | | | 11/2019 | | |
| CN | 110807332 | A | * | 2/2020 | ......... | G06F 16/3329 |
| CN | 111767405 | | | 10/2020 | | |
| WO | 2019/210695 | | | 11/2019 | | |

OTHER PUBLICATIONS

Yonglong Tian et al., "Contrastive Multiview Coding", https://arxiv.org/abs/1906.05849, Jun. 13, 2019.
International Search Report issued Sep. 17, 2021 in International (PCT) Application No. PCT/CN2021/101372.
Cai, Guoyong et al., "Cross-Domain Text Sentiment Classification Based on Domain-Adversarial Network and BERT", (Journal of Shandong University (Engineering Science)), vol. 50, No. 1, Feb. 29, 2020, ISSN: 1672-3961, pp. 1-7 and 20.
(Zhang. Xiaohui et al.). ("Text Representation and Classsification Algorithm Based on Adversarial Training") (Computer Science), vol. 47, No. 6. Jun. 15, 2020 (Jun. 15, 2020). ISSM: 1002-137X. pp. 12-16 (abstract only).
(Chen, Huimin). ("Research on Text Sentiment Analysis Based on Adversarial Training") (Chinese Master's Theses Full-text Database, Information Science (Monthly Journal)), No. 01, Jan. 15, 2020 (Jan. 15, 2020), ISSN: 1674-0246, 1138-2773 (abstract only).

* cited by examiner

METHOD AND APPARATUS FOR TRAINING TEXT CLASSIFICATION MODEL

RELATED APPLICATION

This application is a continuation application of PCT Patent Application No. PCT/CN2021/101372, filed on Jun. 22, 2021, which claims priority to Chinese Patent Application No. 202010753159.6, entitled "METHOD AND APPARATUS FOR TRAINING TEXT CLASSIFICATION MODEL, DEVICE, AND STORAGE MEDIUM" and filed with the China Intellectual Property Administration on Jul. 30, 2020, wherein the content of each of the above-referenced applications is incorporated herein by reference in its entirety.

FIELD OF THE TECHNOLOGY

Embodiments of this disclosure relate to the fields of artificial intelligence and computer technologies, and in particular, to a technology of training a text classification model.

BACKGROUND OF THE DISCLOSURE

With the research and progress of artificial intelligence technologies in text classification models, there are more and more training methods suitable for text classification models.

The input to a text classification model can be a sentence, and the model outputs the category to which the sentence belongs. Conventional text classification models are not very robust, and some small perturbations added to the input sentence may lead to an error in classification performed by the model.

SUMMARY

Embodiments of this disclosure provide a method and an apparatus for training a text classification model, a device, and a storage medium, which can improve the robustness of the text classification model. The technical solutions are as follows.

According to an aspect of the embodiments of this disclosure, a method for training a text classification model is provided. The method is executed by a computer device. The method may include obtaining a training sample of the text classification model. The training sample is a text. The method may further include determining a semantic representation of the training sample using the text classification model and determining a predicted classification result of the training sample based on the semantic representation. The method may further include generating an adversarial sample corresponding to the training sample based on the training sample and perturbation information for the training sample and determining a semantic representation of the adversarial sample corresponding to the training sample using the text classification model. The method may further include determining a classification loss of the text classification model based on the predicted classification result of the training sample, determining a contrastive loss of the text classification model based on the semantic representation of the training sample and the semantic representation of the adversarial sample corresponding to the training sample, and training the text classification model based on the classification loss and the contrastive loss.

According to an aspect of the embodiments of this disclosure, an apparatus for training a text classification model is provided. The apparatus may include a memory operable to store computer-readable instructions and a processor circuitry operable to read the computer-readable instructions. When executing the computer-readable instructions, the processor circuitry may be configured to obtain a training sample of the text classification model. The training sample may be a text. The processor circuitry may be further configured to determine a semantic representation of the training sample using the text classification model and determine a predicted classification result of the training sample based on the semantic representation. The processor circuitry may be further configured to generate an adversarial sample corresponding to the training sample based on the training sample and perturbation information for the training sample and determine a semantic representation of the adversarial sample corresponding to the training sample using the text classification model. The processor circuitry may be further configured to determine a classification loss of the text classification model based on the predicted classification result of the training sample, determine a contrastive loss of the text classification model based on the semantic representation of the training sample and the semantic representation of the adversarial sample corresponding to the training sample, and train the text classification model based on the classification loss and the contrastive loss.

According to an aspect of the embodiments of this disclosure, a non-transitory machine-readable media having instructions stored on the machine-readable media is provided. When being executed, the instructions are configured to cause a machine to obtain a training sample of a text classification model. The training sample may be a text. The instructions are further configured to cause the machine to determine a semantic representation of the training sample using the text classification model and determine a predicted classification result of the training sample based on the semantic representation. The instructions are further configured to cause the machine to generate an adversarial sample corresponding to the training sample based on the training sample and perturbation information for the training sample and determine a semantic representation of the adversarial sample corresponding to the training sample using the text classification model. The instructions are further configured to cause the machine to determine a classification loss of the text classification model based on the predicted classification result of the training sample, determine a contrastive loss of the text classification model based on the semantic representation of the training sample and the semantic representation of the adversarial sample corresponding to the training sample, and train the text classification model based on the classification loss and the contrastive loss.

According to an aspect of the embodiments of this disclosure, a computer program product or a computer program is provided. The computer program product or the computer program includes computer instructions, the computer instructions being stored in a computer-readable storage medium. A processor of a computer device reads the computer instructions from the computer-readable storage medium, and executes the computer instructions, so that the computer device executes the method for training a text classification model.

The technical solutions provided in the embodiments of this disclosure may include the following beneficial effects:

In the process of training the text classification model, in addition to calculating the classification loss of the text classification model, the adversarial sample corresponding to the training sample is generated according to the training sample and the perturbation information for the training sample, the contrastive loss of the model is calculated based on the semantic representations of the training sample and the adversarial sample corresponding to the training sample, and a parameter of the model is optimized based on the classification loss and the contrastive loss, so as to achieve the objective of training the text classification model. In this way, in the process of training the text classification model, it is not only necessary to correctly classify the training sample and the adversarial sample corresponding to the training sample, but is also necessary to make the semantic representation of the training sample outputted by the model as close as possible to the semantic representation of the adversarial sample corresponding to the training sample by calculating the contrastive loss, so as to prevent the encoder of the model from being interfered by the perturbation information. Therefore, this method not only can improve the accuracy and robustness of the classifier, but also can improve the robustness of the encoder, thereby improving both the classification effect and the robustness of the text classification model.

BRIEF DESCRIPTION OF THE DRAWINGS

To describe the technical solutions in the embodiments of this disclosure more clearly, the following briefly introduces the accompanying drawings required for describing the embodiments. Apparently, the accompanying drawings in the following description show only some embodiments of this disclosure, and a person of ordinary skill in the art may still derive other accompanying drawings from these accompanying drawings without creative efforts.

DESCRIPTION OF EMBODIMENTS

To make objectives, technical solutions, and advantages of this disclosure clearer, the following further describes implementations of this disclosure in detail with reference to the accompanying drawings.

Artificial Intelligence (AI) is a theory, a method, a technology, and an application system that use a digital computer or a machine controlled by the digital computer to simulate, extend, and expand human intelligence, perceive an environment, obtain knowledge, and use knowledge to obtain an optimal result. In other words, AI is a comprehensive technology in computer science and attempts to understand the essence of intelligence and produce a new intelligent machine that can react in a manner similar to human intelligence. AI is to study the design principles and implementation methods of various intelligent machines, to enable the machines to have the functions of perception, reasoning, and decision-making.

The AI technology is a comprehensive discipline, and relates to a wide range of fields including both hardware-level technologies and software-level technologies. The basic AI technologies generally include technologies such as a sensor, a dedicated AI chip, cloud computing, distributed storage, a big data processing technology, an operating/interaction system, and electromechanical integration. AI software technologies mainly include several major directions such as a computer vision (CV) technology, a speech processing technology, a natural language processing technology, and machine learning/deep learning.

Natural language processing (NLP) is an important direction in the field of computer technologies and the field of AI. NLP studies various theories and methods for implementing effective communication between human and computers through natural languages. NLP is a science that integrates linguistics, computer science and mathematics. Therefore, studies in this field relate to natural languages, that is, languages used by people in daily life, and NLP is closely related to linguistic studies. The NLP technology generally includes technologies such as text processing, semantic understanding, machine translation, robot question and answer, and knowledge graph.

Machine learning (ML) is a multi-disciplinary subject involving a plurality of disciplines such as probability theory, statistics, approximation theory, convex analysis, and algorithm complexity theory. The ML specializes in studying how a computer simulates or implements a human learning behavior to obtain new knowledge or skills, and reorganize an existing knowledge structure, so as to keep improving performance of the computer. The ML is the core of the AI, is a basic way to make the computer intelligent, and is applied to various fields of AI. The ML and deep learning generally include technologies such as an artificial neural network, a belief network, reinforcement learning, transfer learning, inductive learning, and learning from demonstrations.

With the research and progress of the AI technology, the AI technology is studied and applied in a plurality of fields such as a common smart home, a smart wearable device, a virtual assistant, a smart speaker, smart marketing, unmanned driving, automatic driving, an unmanned aerial vehicle, a robot, smart medical care, and smart customer service. It is believed that with the development of technologies, the AI technology will be applied to more fields, and play an increasingly important role.

The solutions provided in the embodiments of this disclosure relate to natural language processing and machine learning technologies in artificial intelligence, where a text classification model is trained using a machine learning technology, and a text is classified using the text classification model.

In the methods provided in the embodiments of this disclosure, the steps may be executed by a computer device. The computer device refers to an electronic device with data computing, processing, and storage capabilities. The computer device may be a terminal such as a personal computer (PC), a tablet computer, a smart phone, a wearable device, an intelligent robot, etc.; or may be a server. The server may be an independent physical server, a server cluster or a distributed system including multiple physical servers, or a cloud server that provides cloud computing services.

The technical solutions provided in the embodiments of this disclosure can be used in any product or system that requires text classification functions, such as sentiment analysis systems, anti-pornography systems, commodity classification systems, intent classification systems, etc. The technical solutions provided in the embodiments of this disclosure can effectively improve the robustness of the text classification model and improve the accuracy of text classification.

Figure 1:
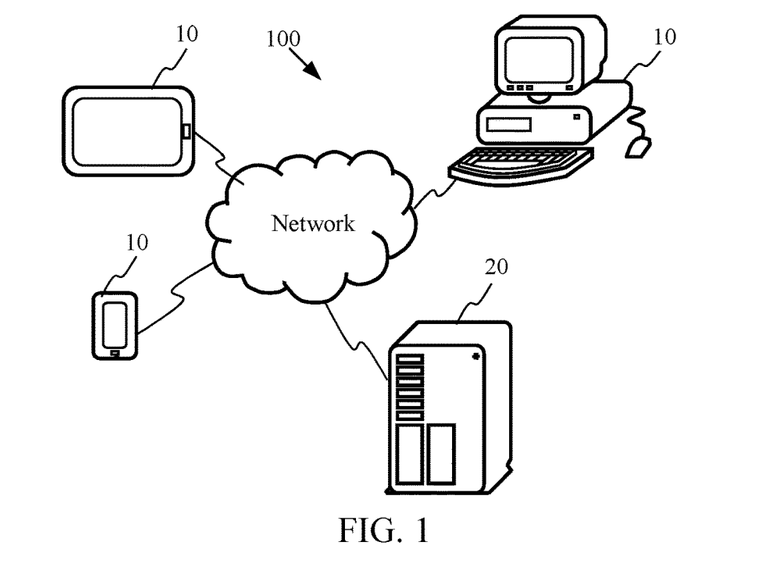
FIG. 1 is a schematic diagram of a solution implementation environment according to an embodiment of this disclosure.

In an example, as shown in FIG. 1, taking a sentiment analysis system 100 as an example, the system may include a terminal 10 and a server 20.

The terminal 10 may be an electronic device such as a mobile phone, a tablet computer, a PC, a wearable device, or the like. A user can access the server 20 through the terminal 10 and perform a text classification operation. For example, a client of a target application may be installed in the terminal 10, and the user can access the server 20 through the client terminal and perform the text classification operation. The target application may be any application that provides a sentiment analysis service, such as an emotion detection application, an intention recognition application, or the like, which is not limited in the embodiments of this disclosure.

The server 20 may be an independent physical server, a server cluster or a distributed system including multiple physical servers, or a cloud server that provides cloud computing services. The server 20 is configured to provide a back-end service for the client of the target application in the terminal 10. For example, the server 20 may be a back-end server of the target application (e.g., an emotion detection application).

The terminal 10 and the server 20 may communicate with each other through a network.

For example, the user inputs a voice message (e.g., "What a nice day today") in the client of the target application. The client transmits the voice message to the server 20. The server 20 first converts the voice message into a text, and then inputs the text input into a text classification model as a to-be-classified text. The text classification model determines a category (e.g., emotion category) of the to-be-classified text, and outputs the emotion category (e.g., happy) corresponding to the to-be-classified text.

Certainly, in some other examples, the text classification model may also be deployed in the terminal 10, for example, in the client of the target application, which is not limited in the embodiments of this disclosure.

Figure 2:
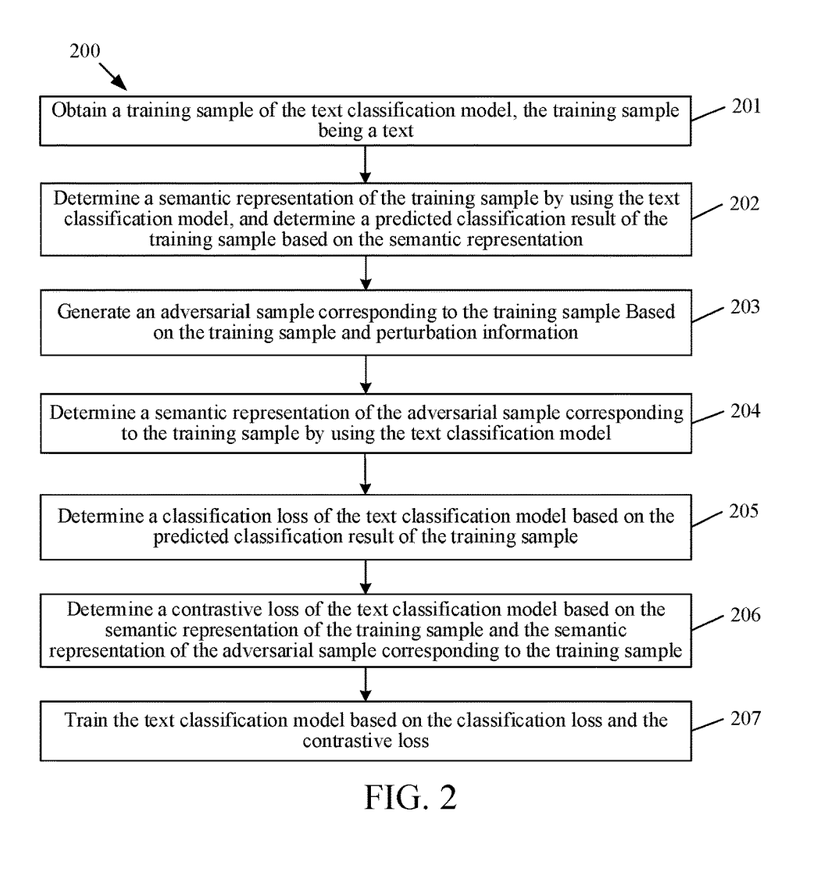
FIG. 2 is a flowchart of a method for training a text classification model according to an embodiment of this disclosure.

FIG. 2 is a flowchart of a method 200 for training a text classification model according to an embodiment of this disclosure. The method may include the following steps (201-207):

Step 201: Obtain a training sample of the text classification model, the training sample being a text.

The text classification model is a machine learning model used to classify a to-be-classified text. Classification categories of the text classification model may be preset, and a classification rule and method of the text classification model may be optimized through model training.

It may be understood that text classification models with different functions may be constructed in different application scenarios. In a sentiment analysis scenario, a text classification model for determining a mood of a target person may be constructed. For example, the text classification model classifies a text into one of two categories: happy and unhappy. When the to-be-classified text is "What a nice day today!", the text classification model determines that the to-be-classified text belongs to the category "happy", and therefore can determine that the mood of the target person is happy. In an intent classification scenario, a text classification model for classifying an intent of a target sentence may be constructed. In a question answering scenario, a text classification model for identifying an answer to a target question may be constructed, which is not limited in this disclosure.

The training sample is a text, the content of which is a character string, including, but not limited to, at least one of words, punctuation marks, special characters, etc. The training sample may be a text in Chinese, e.g., "我爱中国", or a text in a foreign language, e.g., "I Love China" in English, or a text in Chinese and a foreign language, e.g., "China 是中国的意思". The text content of the training sample may be a word, a sentence, a paragraph, an article, etc. In the embodiments of this disclosure, the language type to be identified by the text classification model is not limited, and may be, for example, Chinese, English, Japanese, Korean, etc. For example, when a text classification model for classifying a text in Chinese is required, the training sample may also be in Chinese; when a text classification model for classifying a text in English is required, the training sample may also be in English.

Step 202: Determine a semantic representation of the training sample by using the text classification model, and determine a predicted classification result of the training sample based on the semantic representation.

In the embodiments of this disclosure, the semantic representation refers to a carrier used to represent semantics, and the carrier may be a symbol, a graphic, or a digit. In the embodiments of this disclosure, the carrier is a word embedding available for machine learning. For example, a word embedding (1, 2, 3) is used to represent the Chinese character "我", that is, the semantic representation of "我" is the word embedding (1, 2, 3). The word embedding refers to a form of digital vector representation used to replace a word in a text. The word embedding is also referred to as a word vector.

Figure 3:
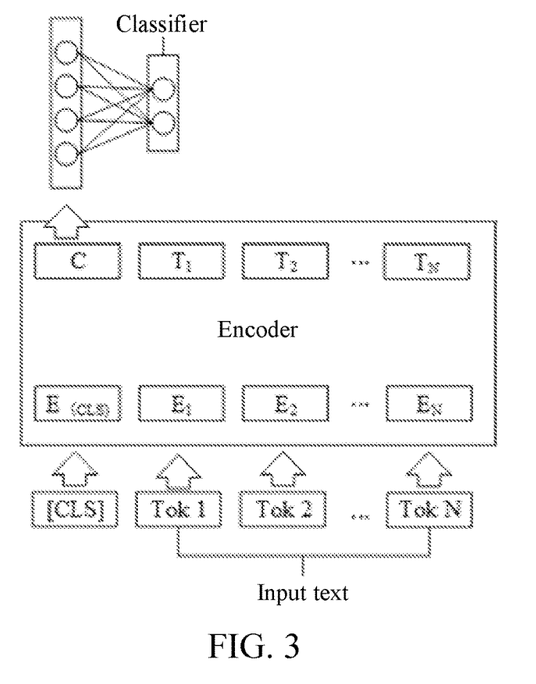
FIG. 3 is a schematic diagram showing an application of a pre-trained model to text classification according to an embodiment of this disclosure.

In an exemplary embodiment, referring to FIG. 3 which takes a Bidirectional Encoder Representations from Transformers (BERT) model as an example, an input text "Tok 1, Tok 2, . . . , Tok N" is obtained (where Tok N represents an $N^{th}$ word segment in the input text (for example, a training sample)). The text classification model adds a [CLS] mark in front of the training sample. The word embedding extraction unit obtains word vectors of word segments in the training sample: "$E_{(CLS)}, E_1, E_2, \ldots, E_n$". Then the encoder obtains corresponding semantic vectors "$C, T_1, T_2, \ldots, T_N$", and a hidden state vector C of [CLS] in the last layer of the encoder is used as a semantic vector of the entire sample, thus obtaining the semantic representation of the training sample, which is then inputted into a classifier composed of a fully connected layer and a Softmax function.

The predicted classification result refers to a prediction result of the category of the training sample that is outputted by the text classification model. The predicted classification result may be the same as a real classification result of the training sample, or may be different from the real classification result of the training sample. The real classification result of the training sample is known, indicating a correct classification result of the training sample. For example, if the real classification result of the training sample is A, and the predicted classification result of the training sample outputted by the text classification model is A, the predicted classification result of the text classification model is the same as the real classification result.

In one example, the text classification model includes a word embedding extraction unit, an encoder, a classifier, and a contrastive loss calculation unit. The word embedding extraction unit is configured to extract a word embedding of the training sample. The encoder is configured to generate a semantic representation of the training sample based on the word embedding of the training sample. The encoder may also be referred to as a feature extractor, which is configured to extract semantic feature information based on the word embedding. The classifier is configured to determine the category of the training sample based on the semantic representation of the training sample. The contrastive loss calculation unit is configured to calculate the contrastive loss of the text classification model. In this case, the training sample is used as an input text to the text classification model.

In a possible implementation, the word embedding extraction unit may be an encoding matrix, for example, a one-hot encoding matrix. The encoder may be a multi-layer neural network. The classifier may be a two-class classifier, a three-class classifier, etc., and its classification categories can be designed according to actual needs.

Figure 4:
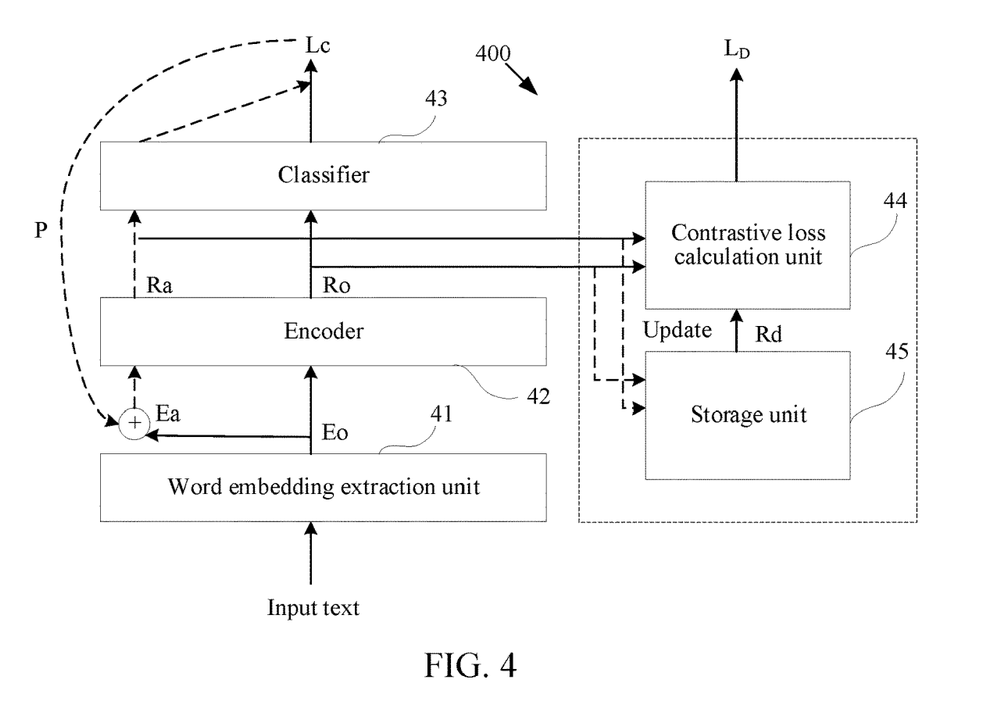
FIG. 4 is an architectural diagram of a method for training a text classification model according to an embodiment of this disclosure.

Referring to FIG. 4, the text classification model 400 includes a word embedding extraction unit 41, an encoder 42, a classifier 43, a contrastive loss calculation unit 44, and a storage unit 45. The text classification model obtains a training sample. The text classification model first uses the word embedding extraction unit 41 to extract a word embedding Eo of the training sample, then uses the encoder 42 to generate a semantic representation Ro of the training sample based on the word embedding Eo, and finally uses the classifier 43 to determine a predicted classification result of the training sample according to the semantic representation Ro. For details of the contrastive loss calculation unit 44 and the storage unit 45, reference may be made to the descriptions below.

Step 203: Generate an adversarial sample corresponding to the training sample according to the training sample and perturbation information for the training sample.

In the embodiments of this disclosure, the adversarial sample refers to a sample newly generated by adding perturbation information to the training sample. The added perturbation information is based on the premise that it does not change the semantics of the training sample, that is, the adversarial sample is semantically consistent with the training sample.

In one example, a process of generating the adversarial samples includes: obtaining a word embedding of the training sample, and then adding perturbation information to the word embedding of the training sample to obtain a processed word embedding, the processed word embedding being the adversarial sample corresponding to the training sample.

For example, referring to FIG. 4, the text classification model 400 obtains a training sample, uses the word embedding extraction unit 41 to extract a word embedding Eo of the training sample, then obtains perturbation information P based on a classification loss Lc, and adds the perturbation information P to the word embedding Eo, thus obtaining a word embedding Ea, Ea being a word embedding of the adversarial sample. Ra is a semantic representation of the adversarial sample. In this disclosure, obtaining the perturbation information P may include: calculating a gradient of the loss function of the text classification model with respect to the training sample, and performing perturbation in a positive gradient direction of the gradient, the perturbation being the perturbation information P.

Exemplarily, the perturbation information is added to a word embedding matrix of the training sample. For example, the word embedding of the training sample is "(1, 2, 3) (4, 5, 6) (7, 8, 9)", the processed word embedding obtained by adding the perturbation information is "(1, 2, 4) (4, 5, 7) (7, 8, 9)".

In another example, the process of generating the adversarial sample includes: adding perturbation information to a text content of the training sample to obtain processed text information, the processed text information being the adversarial sample corresponding to the training sample. For example, when the text classification model obtains a training sample, and directly adds perturbation information to a text content of the training sample to obtain an adversarial sample. Exemplarily, a minor modification such as word order or typo is made to the training sample. For example, if the training sample is "我爱中国", and "我" is changed to a typo "俄", the text information obtained by adding the perturbation information is: "俄爱中国".

The method of adding perturbation information at the word embedding level to generate the adversarial sample and the method of adding perturbation information at the text level to generate the adversarial sample are described above. Compared with the perturbation information at the text level, the perturbation information at the word embedding level achieves a finer granularity. If an adversarial sample corresponding to a training sample is in the form of a word embedding, the adversarial sample may be obtained by a FreeLB algorithm or by a FreeAT algorithm, which is not limited in this disclosure.

In an exemplary embodiment, a method of generating and using the adversarial sample is as follows:

The method may be based on a white-box attack. The white-box attack means that the attacker knows all the information about the attacked text classification model, including model structure, loss function, etc. The attack method is to add perturbation information to the word embedding of the training sample to obtain an adversarial sample. This perturbation information is calculated from the gradient of the loss function, and can make the text classification model more prone to mistakes. The text classification model then optimizes the classification error for the adversarial sample. The entire optimization process is expressed by the following formula:

$$\min_{\theta} \mathbb{E}_{(Z,y)\sim D}\left[\max_{\|\delta\|\leq \epsilon} L(f_\theta(X+\delta), y)\right]$$

where, f represents a forward function of the text classification model, $\theta$ represents a parameter of the text classification model, L represents the loss function of the text classification model, $\delta$ represents the perturbation information, X represents the word embedding of the training sample, y represents the real category of the training sample, D represents a data distribution, and Z represents a word sequence of the training sample.

Step 204: Determine a semantic representation of the adversarial sample corresponding to the training sample by using the text classification model.

Referring to FIG. 4, the text classification model 400 adds the perturbation information P to the word embedding Eo to obtain the word embedding Ea, and then uses the encoder 42 to generate the semantic representation Ra of the adversarial sample based on the word embedding Ea of the adversarial sample.

In this embodiment of this disclosure, the semantic representation of the training sample is a mathematical representation used to characterize a semantic feature of the training sample, and is, for example, mapped to a representation space of the text classification model in the form of a feature vector. The semantic representation of the adversarial sample is a mathematical representation used to characterize a semantic feature of the adversarial sample, and is, for example, mapped to the representation space of the text classification model in the form of a feature vector.

Step 205: Determine a classification loss of the text classification model based on the predicted classification result of the training sample.

The classification loss function is a function used to measure the difference between the predicted classification result and the real classification result. In general, as smaller value of this function indicates a smaller difference between the predicted classification result and the real classification result, and therefore a higher precision of the model. On the contrary, a larger value of this function indicates a greater difference between the predicted classification result and the real classification result, and therefore a lower precision of the model.

Referring to FIG. 4, the predicted classification result of the training sample is obtained by the classifier 43, and then the corresponding classification loss Lc is calculated through the classification loss function based on the predicted classification result of the training sample and the real classification result of the training sample.

In one example, the classification loss of the text classification model is determined based on the predicted classification results of the training sample and the adversarial sample. That is, during calculation of the classification loss, not only the classification loss of the training sample, but also the classification loss of the adversarial sample is considered. For an adversarial sample corresponding to a training sample, a real classification result of the training sample is the same as a real classification result of the adversarial sample. In addition, the predicted classification result of the adversarial sample is outputted by the classifier based on the semantic representation of the adversarial sample.

Step 206: Determine a contrastive loss of the text classification model based on the semantic representation of the training sample and the semantic representation of the adversarial sample corresponding to the training sample.

In this embodiment of this disclosure, the contrastive loss is used to indicate a degree of difference between the semantic representation of the training sample and the semantic representation of the adversarial sample corresponding to the training sample. The degree of difference may be represented by a distance or similarity. In general, a smaller value of the contrastive loss indicates a smaller distance between the semantic representation of the training sample and the semantic representation of the adversarial sample corresponding to the training sample. On the contrary, a larger value of the contrastive loss indicates a larger distance between the semantic representation of the training sample and the semantic representation of the adversarial sample corresponding to the training sample. The text classification model can enhance the robustness of the encoder and output a high-quality adversarial sample by minimizing the contrastive loss and narrowing the distance between the semantic representation of the training sample and the semantic representation of the adversarial sample corresponding to the training sample, thereby improving the classification effect of the classifier, and improving the classification effect and robustness of the text classification model.

Figure 5:
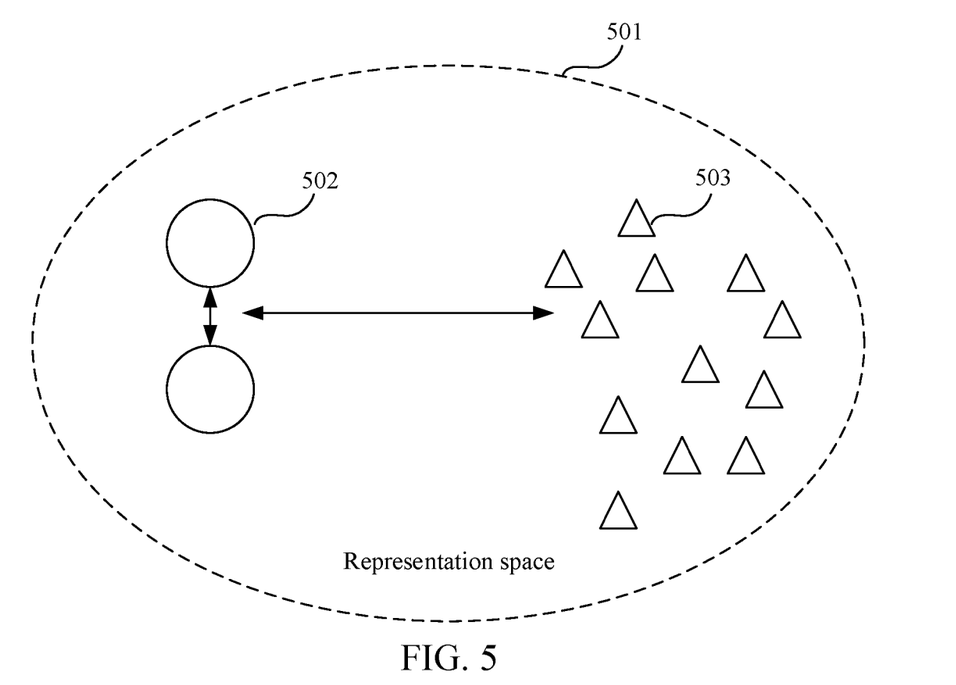
FIG. 5 is a schematic diagram of contrastive learning according to an embodiment of this disclosure.

FIG. 5 is a schematic diagram of contrastive learning according to an embodiment of this disclosure. An ellipse 501 represents a representation space of a text classification model, two circles 502 represent semantic representations of two training samples belonging to the same category, and triangles 503 represent semantic representations of a group of samples belonging to a different category from the circles 502. By minimizing the contrastive loss, reducing the distance between the two circles 502 and increasing the distance between the two circles 502 and the triangles 503, the model can learn a better semantic representation and avoid interference from perturbation information.

In an exemplary embodiment, referring to FIG. 4, based on the semantic representation Ro of the training sample and the semantic representation Ra of the adversarial sample corresponding to the training sample, the text classification model calculates a contrastive loss $L_D$ through the contrastive loss calculation unit 44.

In one example, determining the contrastive loss of the text classification model includes the following steps:

1. Determine a first contrastive loss based on the semantic representation of the training sample, the semantic representation of the adversarial sample corresponding to the training sample, and a semantic representation of a different sample, the different sample being a sample belonging to a different category from the training sample.

In the embodiments of this disclosure, the first contrastive loss refers to a contrastive loss based on the semantic representation of the adversarial sample corresponding to the training sample.

In a possible implementation, the process of determining the first contrastive loss includes: calculating a first similarity, the first similarity being a similarity between the semantic representation of the training sample and the semantic representation of the adversarial sample corresponding to the training sample; calculating a second similarity, the second similarity being a similarity between the semantic representation of the adversarial sample corresponding to the training sample and the semantic representation of the different sample; and calculating the first contrastive loss according to the first similarity and the second similarity.

2. Determine a second contrastive loss based on the semantic representation of the training sample, the semantic representation of the adversarial sample corresponding to the training sample, and a semantic representation of an adversarial sample corresponding to the different sample.

In the embodiments of this disclosure, the text classification model generates the adversarial sample corresponding to the different sample by adding perturbation information to a word embedding of the different sample. For example, the text classification model obtains a different sample that is randomly selected, uses the word embedding extraction unit to extract a word embedding of the different sample, obtains perturbation information by processing a classification loss, and adds the perturbation information to the word embedding of the different sample to obtain a word embedding of an adversarial sample corresponding to the different sample. Based on the word embedding of the adversarial sample corresponding to the different sample, the text classification model uses the encoder to obtain a semantic representation of the adversarial sample corresponding to the different sample. The text classification model may directly add perturbation information to a text of the different sample to obtain an adversarial sample corresponding to the different sample, which is not limited in this disclosure.

The second contrastive loss refers to a contrastive loss based on the semantic representation of the training sample.

In a possible implementation, the process of determining the second contrastive loss includes: calculating a third similarity, the third similarity being a similarity between the semantic representation of the training sample and the semantic representation of the adversarial sample corresponding to the training sample; calculating a fourth similarity, the fourth similarity being a similarity between the semantic representation of the training sample and the semantic representation of the adversarial sample corresponding to the different sample; and calculating the second contrastive loss according to the third similarity and the fourth similarity.

In this embodiment, the different sample may be preset, or may be obtained from samples belonging to a different category from the training sample during calculation of the contrastive loss. For example, m samples are randomly selected as the different samples, where m is a positive integer.

3. Determine the contrastive loss of the text classification model according to the first contrastive loss and the second contrastive loss.

In some cases, the contrastive loss of the text classification model is a sum of the first contrastive loss and the second contrastive loss.

In an exemplary embodiment, a calculation process of the contrastive loss of the text classification model may be expressed by the following formula:

$$L_D^a = - \underset{S_{adv}}{E}\left[\log \frac{h_\theta(\{R_i^{adv}, R_i\})}{\sum_{j=1}^m h_\theta(\{R_i^{adv}, R_{i,j}\})}\right]$$

$$L_D^o = - \underset{S_{orig}}{E}\left[\log \frac{h_\theta(\{R_i, R_i^{adv}\})}{\sum_{j=1}^m h_\theta(\{R_i, R_{i,j}^{adv}\})}\right]$$

$$L_D = L_D^o + L_D^a,$$

where, i represents an $i^{th}$ training sample, $R_i$ represents the semantic representation of the training sample, $R_i^{adv}$ represents the semantic representation of the adversarial sample corresponding to the training sample, $R_{i,j}$ represents a semantic representation of a $j^{th}$ different sample of the $i^{th}$ training sample, $R_{i,j}^{adv}$ represents a semantic representation of an adversarial sample corresponding to the $j^{th}$ different sample of the $i^{th}$ training sample, m represents the number of different samples randomly selected, m is a positive integer for which an upper limit threshold may be set so as to limit the number of different samples and reduce the range of different samples, and j is a positive integer less than or equal to m. $L_D^a$ is a contrastive loss based on the semantic representation of the adversarial sample corresponding to the training sample (that is, the first contrastive loss), and is used to shorten the distance between $R_i^{adv}$ and $R_i$, and at the same time broaden the distances from $R_i^{adv}$ and $R_i$ to $R_{i,j}$. This loss is calculated on a set $S_{adv}=\{R_i^{adv}, R_i, R_{i,1}, \ldots, R_{i,m}\}$. Likewise, $L_D^o$ is a contrastive loss based on the semantic representation of the training sample (that is, the second contrastive loss), and is used to shorten the distance between $R_i$ and $R_i^{adv}$, and at the same time broaden the distances from $R_i$ and $R_i^{adv}$ from $R_{i,j}^{adv}$. This loss is calculated on a set $S_{adv}=\{R_i^{adv}, R_i, R_{i,1}, \ldots, R_{i,m}\}$. The final contrastive loss $L_D$ is a sum of $L_D^a$ and $L_D^o$.

The function $h_\theta$ is a decision function for calculating a similarity between semantic representation of two texts. In general, a higher similarity between two texts indicates a larger output of the function $h_\theta$. Conversely, a lower similarity between two texts indicates a smaller output of $h_\theta$. $h_\theta(\{R_i^{adv}, R_i\})$ is used to determine a similarity between the semantic representation of the adversarial sample corresponding to the training sample and the semantic representation of the training sample, that is, the first similarity. $h_\theta(\{R_i^{adv}, R_{i,j}\})$ is used to determine a similarity between the semantic representation of the adversarial sample corresponding to the training sample and the semantic representation of the different sample, that is, the second similarity. $h_\theta(\{R_i, R_i^{adv}\})$ is used to determine a similarity between the semantic representation of the training sample and the semantic representation of the adversarial sample corresponding to the training sample, that is, the third similarity. $h_\theta(\{R_i, R_{i,j}^{adv}\})$ is used to determine a similarity between the semantic representation of the training sample and the semantic representation of the adversarial sample corresponding to the different sample, that is, the fourth similarity.

For the function $h_\theta$, a result of element-wise multiplication of vectors is used as a similarity score, and a hyperparameter $\tau$ is used to adjust the dynamic range of the similarity score, which is expressed by the following formula:

$$h_\theta(x_1, x_2) = \exp\left(x_1, x_2, \frac{1}{\tau}\right),$$

where, $x_1$ and $x_2$ respectively represent two vectors used for similarity calculation.

In some cases, the consumption of computing resources may be reduced by using a Noise-Contrastive Estimation (NCE) method in this disclosure.

The text classification model needs to obtain a huge number of semantic representations of training samples and adversarial samples corresponding to the training samples, which generally can reach 10,000 to 20,000. Therefore, in this disclosure, the text classification model includes at least two dynamic buffers, such as a first dynamic buffer and a second dynamic buffer. The first dynamic buffer is configured to store the semantic representations of the training samples. The second dynamic buffer is configured to store the semantic representations of the adversarial samples corresponding to the training samples. Data stored in the first dynamic buffer and data stored in the second dynamic buffer are dynamically updated. The following is an update formula for the dynamic buffers:

$$B_{orig}[i]=M*B_{orig}[i]+(1-M)*R_i$$

$$B_{adv}[i]=M*B_{adv}[i]+(1-M)*R_i^{adv},$$

where M represents momentum, a hyperparameter, $B_{orig}[i]$ represents a unit vector dataset that stores the semantic representation of the training sample, and $B_{adv}[i]$ represents a unit vector set that stores the semantic representation of the adversarial sample corresponding to the training sample. $R_i$ and $R_i^{adv}$ obtained in each calculation will be dynamically updated to the corresponding positions in $B_{orig}[i]$ and $B_{adv}[i]$.

When a semantic representation of a training sample and a semantic representation of an adversarial sample corresponding to the training sample are required, it is only necessary to input current sequence numbers of the semantic representation of the training sample and the semantic representation of the adversarial sample corresponding to the training sample in the dynamic buffers, and contents corresponding to the sequence numbers can be directly extracted from the corresponding dynamic buffers. For example, the content stored in $B_{orig}[i]$ is the semantic representation of the $i^{th}$ training sample, and the semantic representation of the $i^{th}$ training sample can be obtained by extracting the stored content corresponding to $B_{orig}[i]$.

Step 207: Train the text classification model according to the classification loss and the contrastive loss.

In one example, training the text classification model includes: determining a total loss of the text classification model according to the classification loss and the contrastive loss; and adjusting a parameter of the text classification model to minimize the total loss and obtain a trained text classification model.

The process of training the text classification model may be expressed by the following formula:

$$\min_{\theta}(L_C + L_D)_{(v,y)\sim D}\left[\max_{\|\delta\|\leq\epsilon}L_C(f_\theta(E + \delta), y)\right]$$

where, f represents a forward function of the text classification model, θ represents a parameter of the text classification model, $L_C$ and $L_D$ represent the classification loss and contrastive loss respectively, v represents a training sample, y represents a real label (i.e., real classification result) of the training sample, D represents a data distribution, δ represents perturbation information, and E represents a word embedding of the training sample. First, the perturbation information δ is obtained by maximizing the classification loss, and then added to the word embedding of the training sample to obtain a corresponding adversarial sample in the form of a word embedding. Then the parameter of the text classification model is adjusted by minimizing the sum of the classification loss $L_C$ and the contrastive loss $L_D$ of the adversarial sample, to obtain a trained text classification model. That is, in the process of training the text classification model, not only the adversarial sample corresponding to the training sample needs to be correctly classified, but also the semantic representation of the adversarial sample corresponding to the training sample needs to be made as similar as possible to the semantic representation of the training sample.

To sum up, according to the technical solutions provided by the embodiments of this disclosure, in the process of training the text classification model, in addition to calculating the classification loss of the text classification model, the adversarial sample corresponding to the training sample is generated according to the training sample and the obtained perturbation information, the contrastive loss of the model is calculated based on the semantic representations of the training sample and the adversarial sample corresponding to the training sample, and a parameter of the model is optimized based on the classification loss and the contrastive loss, so as to achieve the objective of training the text classification model. In this way, in the process of training the text classification model, it is not only necessary to correctly classify the training sample and the adversarial sample corresponding to the training sample, but is also necessary to make the semantic representation of the training sample outputted by the model as close as possible to the semantic representation of the adversarial sample corresponding to the training sample by calculating the contrastive loss, so as to prevent the encoder of the model from being interfered by the perturbation information. Therefore, this method not only can improve the accuracy and robustness of the classifier, but also can improve the robustness of the encoder, thereby improving both the classification effect and the robustness of the text classification model.

In addition, this disclosure can enhance the robustness of the encoder and output a high-quality adversarial sample by minimizing the contrastive loss and narrowing the representation distance between the semantic representation of the training sample and the semantic representation of the adversarial sample corresponding to the training sample, thereby improving the classification effect of the classifier, and improving the classification effect and robustness of the text classification model.

The method for training a text classification model has been described above. How the text classification model determines a category of a to-be-classified text will be described below.

Figure 6:
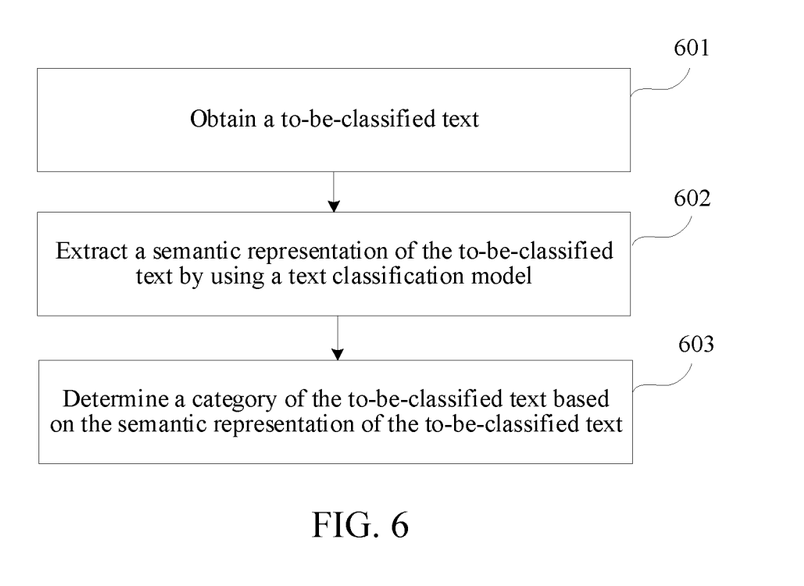
FIG. 6 is a flowchart of a text classification method according to an embodiment of this disclosure.

In one example, referring to FIG. 6, the determining of the category of the to-be-categorized text by the text classification model specifically includes the following steps (601-603):

Step 601: Obtain a to-be-classified text.

A category of the to-be-classified text is unknown, and there may be one or more to-be-classified texts.

Step 602: Extract a semantic representation of the to-be-classified text by using a text classification model.

The text classification model includes a word embedding extraction unit, an encoder, and a classifier. The word embedding extraction unit is configured to extract a word embedding of the to-be-classified text. The encoder is configured to generate a semantic representation of the to-be-classified text based on the word embedding of the to-be-classified text. The classifier is configured to determine the category of the to-be-classified text based on the semantic representation of the to-be-classified text. In this case, the to-be-classified text is used as an input text to the text classification model.

For example, based on the word embedding of the to-be-classified text, the text classification model generates the semantic representation of the to-be-classified text through the encoder.

Step 603: Determine a category of the to-be-classified text based on the semantic representation of the to-be-classified text.

Based on the semantic representation of the to-be-classified text, the text classification model determines the category of the to-be-classified text through the classifier. The category of the to-be-classified text outputted by the text classification model may be a category taking up a largest proportion among all categories in the model.

To sum up, in this disclosure, the to-be-classified text is classified using the trained text classification model, so as to determine the category of the to-be-classified text.

The following is an apparatus embodiment of this disclosure, which can be configured to execute the method embodiments of this disclosure. For details not disclosed in the apparatus embodiments of this disclosure, refer to the method embodiments of this disclosure.

Figure 7:
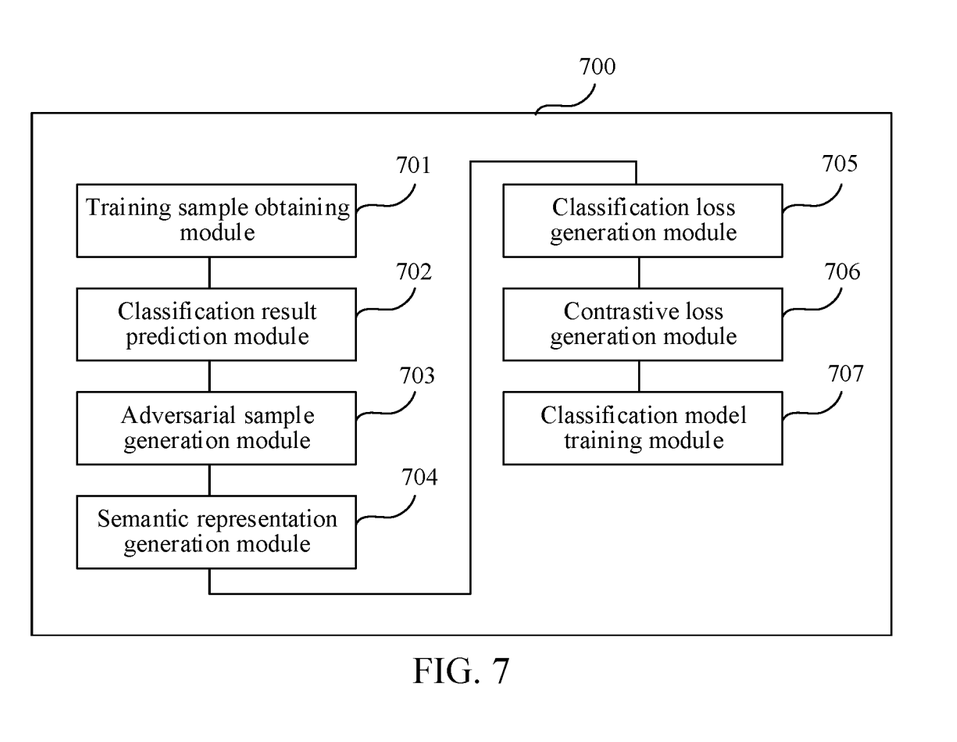
FIG. 7 is a block diagram of an apparatus for training a text classification model according to an embodiment of this disclosure.

FIG. 7 is a block diagram of an apparatus for training a text classification model according to an embodiment of this disclosure. The apparatus has functions of implementing the foregoing method embodiments. The functions may be implemented by hardware, or may be implemented by hardware executing corresponding software. The apparatus may be the computer device described above, or may be disposed in the computer device. As shown in FIG. 7, the apparatus 700 includes: a training sample obtaining module 701, a classification result prediction module 702, an adversarial sample generation module 703, a semantic representation generation module 704, a classification loss generation module 705, a contrastive loss generation module 706, and a classification model training module 707.

Herein, the term module (and other similar terms such as unit, submodule, etc.) may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module. A module is configured to perform functions and achieve goals such as those described in this disclosure, and may work together with other related modules, programs, and components to achieve those functions and goals.

The training sample obtaining module 701 is configured to obtain a training sample of the text classification model, the training sample being a text.

The classification result prediction module 702 is configured to determine a semantic representation of the training sample by using the text classification model, and determine a predicted classification result of the training sample based on the semantic representation.

The adversarial sample generation module 703 is configured to generate an adversarial sample corresponding to the training sample according to the training sample and obtained perturbation information.

The semantic representation generation module 704 is configured to determine a semantic representation of the adversarial sample corresponding to the training sample by using the text classification model.

The classification loss generation module 705 is configured to determine a classification loss of the text classification model based on the predicted classification result of the training sample.

The contrastive loss generation module 706 is configured to determine a contrastive loss of the text classification model based on the semantic representation of the training sample and the semantic representation of the adversarial sample corresponding to the training sample.

The classification model training module 707 is configured to train the text classification model according to the classification loss and the contrastive loss.

Figure 8:
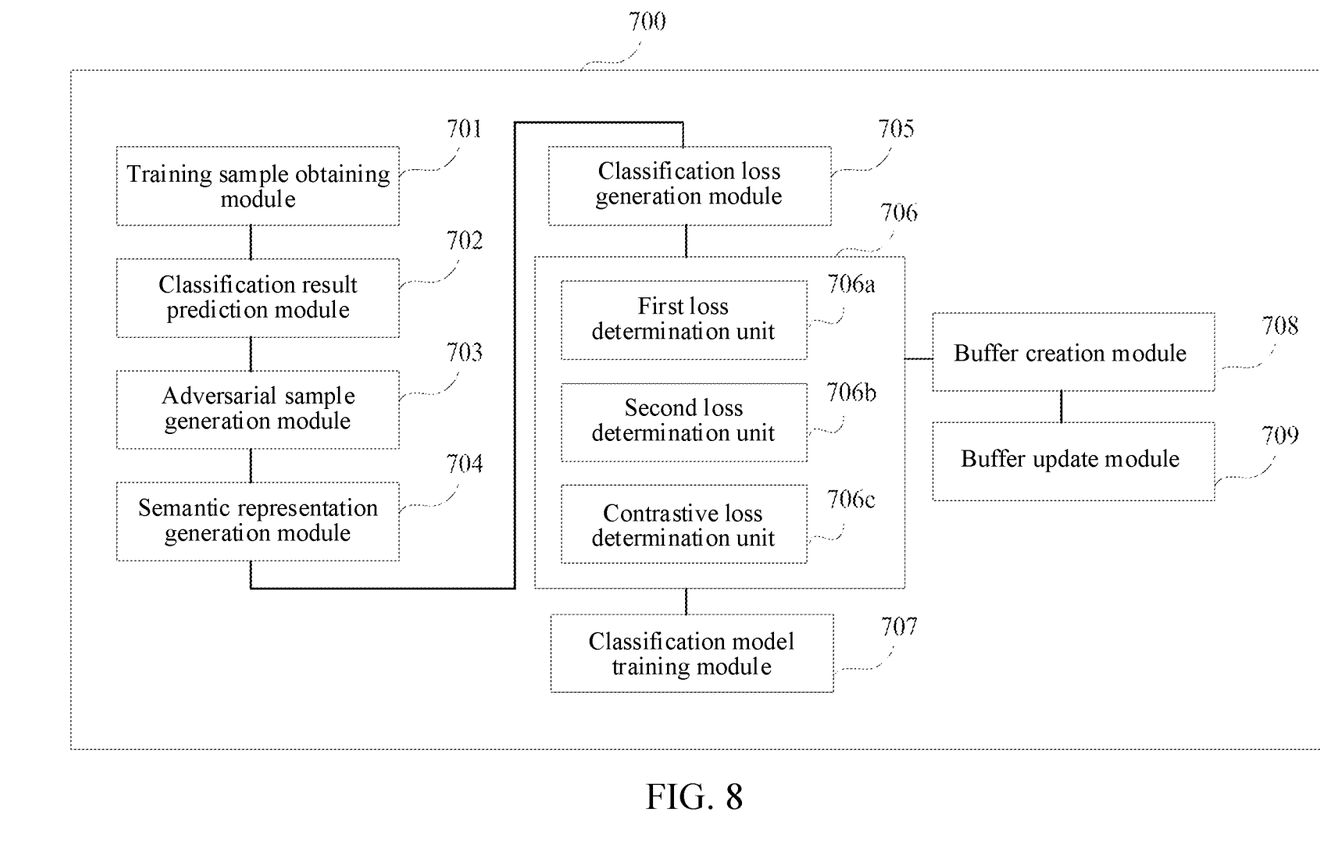
FIG. 8 is a block diagram of an apparatus for training a text classification model according to another embodiment of this disclosure.

In an exemplary embodiment, as shown in FIG. 8, the contrastive loss generation module 706 includes: a first loss determination unit 706a, a second loss determination unit 706b, and a contrastive loss determination unit 706c.

The first loss determination unit 706a is configured to determine a first contrastive loss based on the semantic representation of the training sample, the semantic representation of the adversarial sample corresponding to the training sample, and a semantic representation of a different sample, the different sample being a sample belonging to a different category from the training sample.

The second loss determination unit 706b is configured to determine a second contrastive loss based on the semantic representation of the training sample, the semantic representation of the adversarial sample corresponding to the training sample, and a semantic representation of an adversarial sample corresponding to the different sample.

The contrastive loss determination unit 706c is configured to determine the contrastive loss of the text classification model according to the first contrastive loss and the second contrastive loss.

In an exemplary embodiment, the first loss determination unit 706a is configured to execute the following operations:
  calculating a first similarity, the first similarity being a similarity between the semantic representation of the adversarial sample corresponding to the training sample and the semantic representation of the training sample;
  calculating a second similarity, the second similarity being a similarity between the semantic representation of the adversarial sample corresponding to the training sample and the semantic representation of the different sample; and
  calculating the first contrastive loss according to the first similarity and the second similarity.

In an exemplary embodiment, the second loss determination unit 706b is configured to execute the following operations:
  calculating a third similarity, the third similarity being a similarity between the semantic representation of the training sample and the semantic representation of the adversarial sample corresponding to the training sample;
  calculating a fourth similarity, the fourth similarity being a similarity between the semantic representation of the training sample and the semantic representation of the adversarial sample corresponding to the different sample; and
  calculating the second contrastive loss according to the third similarity and the fourth similarity.

In an exemplary embodiment, the first loss determination unit 706a or the second loss determination unit 706b is further configured to execute the following operations:
  selecting m samples from samples belonging to different categories from the training sample, to obtain the different samples, m being a positive integer.

In an exemplary embodiment, the classification model training module 707 is configured to execute the following operations:
  determining a total loss of the text classification model according to the classification loss and the contrastive loss; and
  adjusting a parameter of the text classification model to minimize the total loss and obtain a trained text classification model.

In an exemplary embodiment, the adversarial sample generation module 703 is configured to execute the following operations:
  obtaining a word embedding of the training sample; and
  adding perturbation information to the word embedding of the training sample to obtain a processed word embedding,
  the processed word embedding being used as the adversarial sample corresponding to the training sample.

In an exemplary embodiment, the adversarial sample generation module 703 is configured to execute the following operations:
  adding perturbation information to a text content of the training sample to obtain processed text information, the processed text information being used as the adversarial sample corresponding to the training sample.

In an exemplary embodiment, as shown in FIG. 8, the apparatus 700 further includes: a buffer creation module 708 and a buffer update module 709.

The buffer creation module 708 is configured to create a first buffer and a second buffer, the first buffer being configured to store the semantic representation of the training sample, and the second buffer being configured to store the semantic representation of the adversarial sample corresponding to the training sample.

The buffer update module 709 is configured to dynamically update data stored in the first buffer.

The buffer update module 709 is further configured to dynamically update data stored in the second buffer.

In an exemplary embodiment, the text classification model includes a word embedding extraction unit, an encoder, a classifier, and a contrastive loss calculation unit.

The word embedding extraction unit is configured to extract a word embedding of an input text.

The encoder is configured to generate a semantic representation of the input text based on the word embedding of the input text.

The classifier is configured to determine a category of the input text based on the semantic representation of the input text.

The contrastive loss calculation unit is configured to calculate the contrastive loss of the text classification model.

To sum up, according to the technical solutions provided by the embodiments of this disclosure, in the process of training the text classification model, in addition to calculating the classification loss of the text classification model, the adversarial sample corresponding to the training sample is generated according to the training sample and the obtained perturbation information, the contrastive loss of the model is calculated based on the semantic representations of the training sample and the adversarial sample corresponding to the training sample, and a parameter of the model is optimized based on the classification loss and the contrastive loss, so as to achieve the objective of training the text classification model. In this way, in the process of training the text classification model, it is not only necessary to correctly classify the training sample and the adversarial sample corresponding to the training sample, but is also necessary to make the semantic representation of the training sample outputted by the model as close as possible to the semantic representation of the adversarial sample corresponding to the training sample by calculating the contrastive loss, so as to prevent the encoder of the model from being interfered by the perturbation information. Therefore, this method not only can improve the accuracy and robustness of the classifier, but also can improve the robustness of the encoder, thereby improving both the classification effect and the robustness of the text classification model.

When the apparatus provided in the foregoing embodiments implements functions of the apparatus, the division of the foregoing functional modules is merely an example for description. In the practical application, the functions may be assigned to and completed by different functional modules according to the requirements, that is, the internal structure of the device is divided into different functional modules, to implement all or some of the functions described above. In addition, the apparatus and method embodiments provided in the foregoing embodiments belong to the same concept. For the specific implementation process, reference may be made to the method embodiments, and details are not described herein again.

Figure 9:
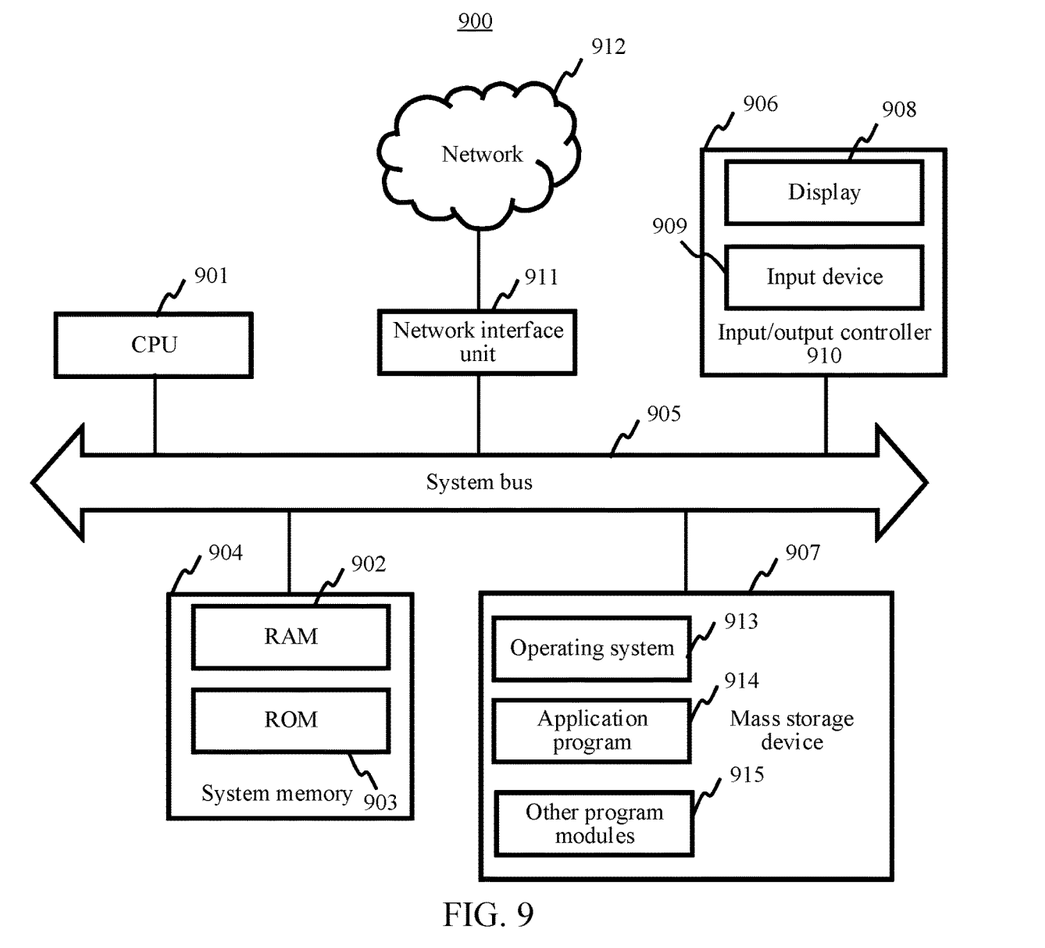
FIG. 9 is a block diagram of a computer device according to an embodiment of this disclosure.

FIG. 9 is a schematic block diagram of a computer device according to an embodiment of this disclosure. The computer device may be configured to implement the method for training a text classification model provided in the above embodiments. To be specific, the computer device 900 includes a processing unit (such as a central processing unit (CPU), a graphics processing unit (GPU), and a field programmable gate array (FPGA), etc.) 901, a system memory 904 including a random-access memory (RAM) 902 and a read-only memory (ROM) 903, and a system bus 905 connecting the system memory 904 and the central processing unit 901. The computer device 900 further includes a basic input/output system (I/O system) 906 configured to transmit information between components in the server, and a mass storage device 907 configured to store an operating system 913, an application program 914, and other program modules 915.

The basic I/O system 906 includes a display 908 configured to display information and an input device 909, such as a mouse or a keyboard, for a user to input information. The display 908 and the input device 909 are both connected to the CPU 901 by using an input/output controller 910 connected to the system bus 905. The basic I/O system 906 may further include the I/O controller 910 configured to receive and process inputs from a plurality of other devices such as a keyboard, a mouse, or an electronic stylus. Similarly, the input/output controller 910 further provides output to a display screen, a printer, or other types of output devices.

The mass storage device 907 is connected to the CPU 901 by using a mass storage controller (not shown) connected to the system bus 905. The mass storage device 907 and an associated computer-readable medium provide non-transitory storage for the computer device 900. That is, the mass storage device 907 may include a computer-readable medium (not shown) such as a hard disk or a compact disc ROM (CD-ROM) drive.

Without loss of generality, the computer-readable medium may include a computer storage medium and a communication medium. The computer-storage medium includes volatile and non-transitory media, and removable and non-removable media implemented by using any method or technology used for storing information such as computer-readable instructions, data structures, program modules, or other data. The computer storage medium includes a RAM, a ROM, an erasable programmable ROM (EPROM), an electrically erasable programmable ROM (EEPROM), a flash memory or another solid-state memory technology, a CD-ROM, a digital versatile disc (DVD) or another optical memory, a tape cartridge, a magnetic cassette, a magnetic disk memory, or another magnetic storage device. Certainly, a person skilled in the art can know that the computer storage medium is not limited to the foregoing several types. The system memory 904 and the large-capacity storage device 907 may be collectively referred to as a memory.

According to the embodiments of this disclosure, the computer device 900 may be further connected, through a network such as the Internet, to a remote computer on the network and run. That is, the computer device 900 may be connected to a network 912 by using a network interface unit 911 connected to the system bus 905, or may be connected to another type of network or a remote computer system (not shown) by using a network interface unit 911.

The memory further includes a computer program. The computer program is stored in the memory and configured to be executed by one or more processors to implement the method for training a text classification model.

In an exemplary embodiment, a computer-readable storage medium is further provided. The computer-readable storage medium stores at least one instruction, at least one program, a code set, or an instruction set, the at least one instruction, the at least one program, the code set, or the instruction set being executed by a processor to implement the method for training a text classification model.

The computer-readable storage medium may include: a read only memory (ROM), a random access memory (RAM), a solid state hard disk (SSD), an optical disc, and the like. The random access memory may include a resistive random access memory (ReRAM) and a dynamic random access memory (DRAM).

In an exemplary embodiment, a computer program product or a computer program is provided. The computer program product or the computer program includes computer instructions, and the computer instructions are stored in a computer-readable storage medium. A processor of a computer device reads the computer instructions from the computer-readable storage medium, and executes the computer instructions, so that the computer device executes the method for training a text classification model.

"A plurality of" mentioned in the specification means two or more. "And/or" describes an association relationship for associated objects and represents that three relationships may exist. For example, A and/or B may represent the following three cases: only A exists, both A and B exist, and only B exists. The character "/" generally indicates an "or" relationship between the associated objects. In addition, the step numbers described in this specification merely exemplarily show a possible execution sequence of the steps. In some other embodiments, the steps may not be performed according to the number sequence. For example, two steps with different numbers may be performed simultaneously, or two steps with different numbers may be performed according to a sequence contrary to the sequence shown in the figure. This is not limited in the embodiments of this disclosure.

The foregoing descriptions are merely exemplary embodiments of this disclosure, but are not intended to limit this disclosure. Any modification, equivalent replacement, or improvement made within the spirit and principle of this disclosure shall fall within the protection scope of this disclosure.

What is claimed is:

1. A method for training a text classification model, executed by a computer device, the method comprising:
   obtaining a training sample of the text classification model, the training sample being a text;
   determining a semantic representation of the training sample using the text classification model, wherein the semantic representation of the training sample represents a semantic of the training sample;
   determining a predicted classification result of the training sample based on the semantic representation;
   generating an adversarial sample corresponding to the training sample based on the training sample and perturbation information for the training sample;
   determining a semantic representation of the adversarial sample corresponding to the training sample using the text classification model, wherein the semantic representation of the adversarial sample represents a semantic of the adversarial sample, the semantic of the adversarial sample is consistent with the semantic of the training sample;
   determining a classification loss of the text classification model based on the predicted classification result of the training sample;
   determining a contrastive loss of the text classification model based on the semantic representation of the training sample and the semantic representation of the adversarial sample corresponding to the training sample; and
   training the text classification model based on the classification loss and the contrastive loss.

2. The method of claim 1, wherein the determining the contrastive loss of the text classification model based on the semantic representation of the training sample and the semantic representation of the adversarial sample corresponding to the training sample comprises:
   determining a first contrastive loss based on the semantic representation of the training sample, the semantic representation of the adversarial sample corresponding to the training sample, and a semantic representation of a different sample, the different sample being a sample belonging to a different category from the training sample;
   determining a second contrastive loss based on the semantic representation of the training sample, the semantic representation of the adversarial sample corresponding to the training sample, and a semantic representation of an adversarial sample corresponding to the different sample; and
   determining the contrastive loss of the text classification model based on the first contrastive loss and the second contrastive loss.

3. The method of claim 2, wherein the determining the first contrastive loss based on the semantic representation of the training sample, the semantic representation of the adversarial sample corresponding to the training sample, and the semantic representation of the different sample comprises:
   calculating a first similarity, the first similarity being a similarity between the semantic representation of the adversarial sample corresponding to the training sample and the semantic representation of the training sample;
   calculating a second similarity, the second similarity being a similarity between the semantic representation of the adversarial sample corresponding to the training sample and the semantic representation of the different sample; and
   calculating the first contrastive loss based on the first similarity and the second similarity.

4. The method of claim 2, wherein the determining the second contrastive loss based on the semantic representation of the training sample, the semantic representation of the adversarial sample corresponding to the training sample, and the semantic representation of the adversarial sample corresponding to the different sample comprises:
   calculating a third similarity, the third similarity being a similarity between the semantic representation of the training sample and the semantic representation of the adversarial sample corresponding to the training sample;
   calculating a fourth similarity, the fourth similarity being a similarity between the semantic representation of the training sample and the semantic representation of the adversarial sample corresponding to the different sample; and
   calculating the second contrastive loss based on the third similarity and the fourth similarity.

5. The method of claim 4, further comprising:
selecting m samples from samples belonging to different categories from the training sample, to obtain different samples, m being a positive integer.

6. The method of claim 1, wherein the training the text classification model based on the classification loss and the contrastive loss comprises:
determining a total loss of the text classification model based on the classification loss and the contrastive loss; and
adjusting a parameter of the text classification model to minimize the total loss and obtain a trained text classification model.

7. The method of claim 1, wherein the generating the adversarial sample corresponding to the training sample based on the training sample and the perturbation information comprises:
obtaining a word embedding of the training sample; and
adding the perturbation information to the word embedding of the training sample to obtain a processed word embedding, the processed word embedding being used as the adversarial sample corresponding to the training sample.

8. The method of claim 1, wherein the generating the adversarial sample corresponding to the training sample based on the training sample and the perturbation information comprises:
adding the perturbation information to a text content of the training sample to obtain processed text information, the processed text information being used as the adversarial sample corresponding to the training sample.

9. The method of claim 1, further comprising:
creating a first buffer and a second buffer, the first buffer being for storing the semantic representation of the training sample, and the second buffer being for storing the semantic representation of the adversarial sample corresponding to the training sample;
dynamically updating data stored in the first buffer; and
dynamically updating data stored in the second buffer.

10. The method of claim 1, wherein the text classification model comprises a word embedding extraction unit, an encoder, a classifier, and a contrastive loss calculation unit, wherein,
the word embedding extraction unit is configured to extract a word embedding of an input text;
the encoder is configured to generate a semantic representation of the input text based on the word embedding of the input text;
the classifier is configured to determine a category of the input text based on the semantic representation of the input text; and
the contrastive loss calculation unit is configured to calculate the contrastive loss of the text classification model.

11. An apparatus for training a text classification model, comprising:
a memory operable to store computer-readable instructions; and
a processor circuitry operable to read the computer-readable instructions, the processor circuitry when executing the computer-readable instructions is configured to:
obtain a training sample of the text classification model, the training sample being a text;
determine a semantic representation of the training sample using the text classification model, wherein the semantic representation of the training sample represents a semantic of the training sample;
determine a predicted classification result of the training sample based on the semantic representation;
generate an adversarial sample corresponding to the training sample based on the training sample and perturbation information for the training sample;
determine a semantic representation of the adversarial sample corresponding to the training sample using the text classification model, wherein the semantic representation of the adversarial sample represents a semantic of the adversarial sample, the semantic of the adversarial sample is consistent with the semantic of the training sample;
determine a classification loss of the text classification model based on the predicted classification result of the training sample;
determine a contrastive loss of the text classification model based on the semantic representation of the training sample and the semantic representation of the adversarial sample corresponding to the training sample; and
train the text classification model based on the classification loss and the contrastive loss.

12. The apparatus of claim 11, wherein the processor circuitry is configured to:
determine a first contrastive loss based on the semantic representation of the training sample, the semantic representation of the adversarial sample corresponding to the training sample, and a semantic representation of a different sample, the different sample being a sample belonging to a different category from the training sample;
determine a second contrastive loss based on the semantic representation of the training sample, the semantic representation of the adversarial sample corresponding to the training sample, and a semantic representation of an adversarial sample corresponding to the different sample; and
determine the contrastive loss of the text classification model based on the first contrastive loss and the second contrastive loss.

13. The apparatus of claim 12, wherein the processor circuitry is configured to:
calculate a first similarity, the first similarity being a similarity between the semantic representation of the adversarial sample corresponding to the training sample and the semantic representation of the training sample;
calculate a second similarity, the second similarity being a similarity between the semantic representation of the adversarial sample corresponding to the training sample and the semantic representation of the different sample; and
calculate the first contrastive loss based on the first similarity and the second similarity.

14. The apparatus of claim 12, wherein the processor circuitry is configured to:
calculate a third similarity, the third similarity being a similarity between the semantic representation of the training sample and the semantic representation of the adversarial sample corresponding to the training sample;
calculate a fourth similarity, the fourth similarity being a similarity between the semantic representation of the training sample and the semantic representation of the adversarial sample corresponding to the different sample; and calculate the second contrastive loss based on the third similarity and the fourth similarity.

15. The apparatus of claim 14, wherein the processor circuitry is further configured to:

select m samples from samples belonging to different categories from the training sample, to obtain the different samples, m being a positive integer.

16. The apparatus of claim 11, wherein the processor circuitry is configured to:

determine a total loss of the text classification model based on the classification loss and the contrastive loss; and adjust a parameter of the text classification model to minimize the total loss and obtain a trained text classification model.

17. The apparatus of claim 11, wherein the processor circuitry is configured to:

obtain a word embedding of the training sample; and add the perturbation information to the word embedding of the training sample to obtain a processed word embedding, the processed word embedding being used as the adversarial sample corresponding to the training sample.

18. The apparatus of claim 11, wherein the processor circuitry is configured to:

add the perturbation information to a text content of the training sample to obtain processed text information, the processed text information being used as the adversarial sample corresponding to the training sample.

19. The apparatus of claim 11, wherein the processor circuitry is further configured to:

create a first buffer and a second buffer, the first buffer being for storing the semantic representation of the training sample, and the second buffer being for storing the semantic representation of the adversarial sample corresponding to the training sample;

dynamically update data stored in the first buffer; and dynamically update data stored in the second buffer.

20. A non-transitory machine-readable media, having instructions stored on the machine-readable media, the instructions configured to, when executed, cause a machine to:

obtain a training sample of a text classification model, the training sample being a text;

determine a semantic representation of the training sample using the text classification model, wherein the semantic representation of the training sample represents a semantic of the training sample;

determine a predicted classification result of the training sample based on the semantic representation;

generate an adversarial sample corresponding to the training sample based on the training sample and perturbation information for the training sample;

determine a semantic representation of the adversarial sample corresponding to the training sample using the text classification model, wherein the semantic representation of the adversarial sample represents a semantic of the adversarial sample, the semantic of the adversarial sample is consistent with the semantic of the training sample;

determine a classification loss of the text classification model based on the predicted classification result of the training sample;

determine a contrastive loss of the text classification model based on the semantic representation of the training sample and the semantic representation of the adversarial sample corresponding to the training sample; and train the text classification model based on the classification loss and the contrastive loss.

* * * * *